(12) United States Patent
Chen

(10) Patent No.: US 7,411,744 B2
(45) Date of Patent: Aug. 12, 2008

(54) OBSTACLE-DETECTABLE MOBILE ROBOTIC DEVICE

(75) Inventor: Hung-Kai Chen, Taichung County (TW)

(73) Assignee: E-Supply International Co., Ltd., Taichung (TW)

( * ) Notice: Subject to any disclaimer, the term of this patent is extended or adjusted under 35 U.S.C. 154(b) by 45 days.

(21) Appl. No.: 11/454,954

(22) Filed: Jun. 19, 2006

(65) Prior Publication Data
US 2007/0145235 A1    Jun. 28, 2007

(30) Foreign Application Priority Data
Dec. 27, 2005    (TW)    .............................. 94222768 U

(51) Int. Cl.
*G02B 17/00*    (2006.01)
*B25J 5/00*    (2006.01)
*B64C 13/18*    (2006.01)
*G05D 1/00*    (2006.01)

(52) U.S. Cl. ................... 359/726; 318/568.12
(58) Field of Classification Search ................. 359/726, 359/838, 896; 318/568.12, 587
See application file for complete search history.

(56) References Cited

U.S. PATENT DOCUMENTS

| 4,345,662 | A | * | 8/1982 | Deplante | ............... 180/168 |
| 5,898,183 | A | * | 4/1999 | Teder | ............... 250/574 |
| 6,594,844 | B2 | | 7/2003 | Jones | |

\* cited by examiner

*Primary Examiner*—Alicia M Harrington
(74) *Attorney, Agent, or Firm*—Bacon & Thomas, PLLC

(57) ABSTRACT

An obstacle-detectable mobile robotic device includes a frame body capable of traveling on a surface, a control circuit mounted to the frame body for controlling the traveling manner and direction of the frame body, and a detection system mounted to the frame body and electrically connected with the control circuit. The detection system has an optical emitter, an optical receiver, and a reflector. The optical emitter emits the light onto the surface, and the light is reflected onto the reflector and then to the optical receiver to be received by the optical receiver. A receiving area generated by the optical receiver on the reflector never overlaps the surface. Accordingly, the obstacle-detectable mobile robotic device can effectively avoid ambient light pollution to have preferable detection potency.

4 Claims, 5 Drawing Sheets

OBSTACLE-DETECTABLE MOBILE ROBOTIC DEVICE

BACKGROUND OF THE INVENTION

1. Field of the Invention

The present invention relates generally to mobile robotic devices, and more particularly, to an obstacle-detectable mobile robotic device.

2. Description of the Related Art

U.S. Pat. No. 6,594,844 disclosed an obstacle detection system for an autonomous cleaning robot, on which an optical emitter and a photon detector are mounted for emission and reception respectively on a surface, like the ground, that the robot travels. As a projection area generated by the optical emitter on the surface overlaps a detection area generated by the photon detector on the surface, the light emitted from the optical emitter is received by the photon detector; meanwhile, the robot is located on the smooth ground. While the robot travels and encounters a stair or a cavity, i.e. the surface on which the robot travels suddenly lowers its position, the projection area and the detection area do not overlap each other to enable the robot to regard it as encountering a barrier.

Although the above-mentioned prior art can overcome the problem while encountering the barrier, there is still space for improvement because of the following drawbacks. Generating the projection and detection areas directly on the ground by the optical emitter and the photon detector is vulnerable to the interference of external light pollution. In other words, if any external polarized light is reflected to project itself on the photon detector, misjudgment will be incurred. In addition, if the external light directly enters the detection area, the photon detector may do the misjudgment thereof due to detecting the external light.

SUMMARY OF THE INVENTION

The primary objective of the present invention is to provide an obstacle-detectable mobile robotic device, which can do more accurate obstacle detection to have better obstacle-elusive potency.

The secondary objective of the present invention is to provide an obstacle-detectable mobile robotic device, which is not vulnerable to the ambient light pollution and more sensitive in detection.

The foregoing objectives of the present invention are attained by the obstacle-detectable mobile robotic device, which is composed of a frame body, a control circuit, and a detection system. The frame body can travel on a surface. The control circuit is mounted to the frame body for controlling the way and direction that the frame body travels. The detection system is mounted to the frame body and electrically connected with the control circuit, having an optical emitter, an optical receiver, and a reflector. The optical emitter emits the light toward the surface at a predetermined angle, defining a projection area on the surface. The reflector faces the projection area at a predetermined angle. The light is emitted onto the projection area and then reflected onto the reflector, defining a reflective area on the reflector. The location of the reflective area on the reflector is variable subject to the height that the surface is positioned. The optical receiver faces the reflector, defining a receiving area on the reflector. The receiving are never overlaps the surface. While the optical emitter is spaced from the surface for a predetermined distance, the reflective area overlaps the receiving area. While the optical emitter is farther away from the surface, the reflective area does not overlap the surface. Accordingly, whether the optical receiver receives the light or not depends on whether the receiving area overlaps the reflective area or not.

DETAILED DESCRIPTION OF PREFERRED EMBODIMENTS

Figure 1:
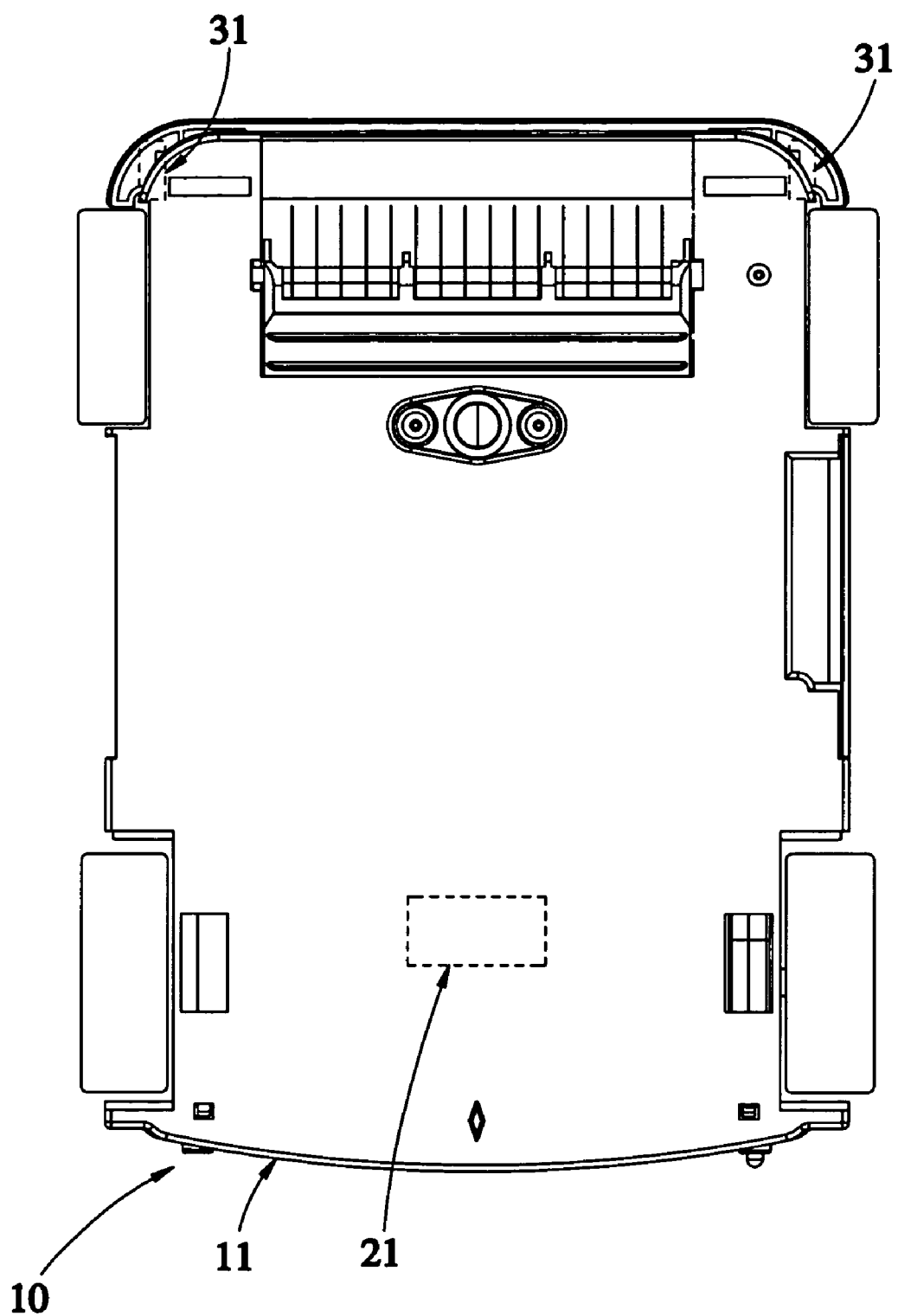
FIG. 1 is a bottom view of a preferred embodiment of the present invention.
Figure 2:
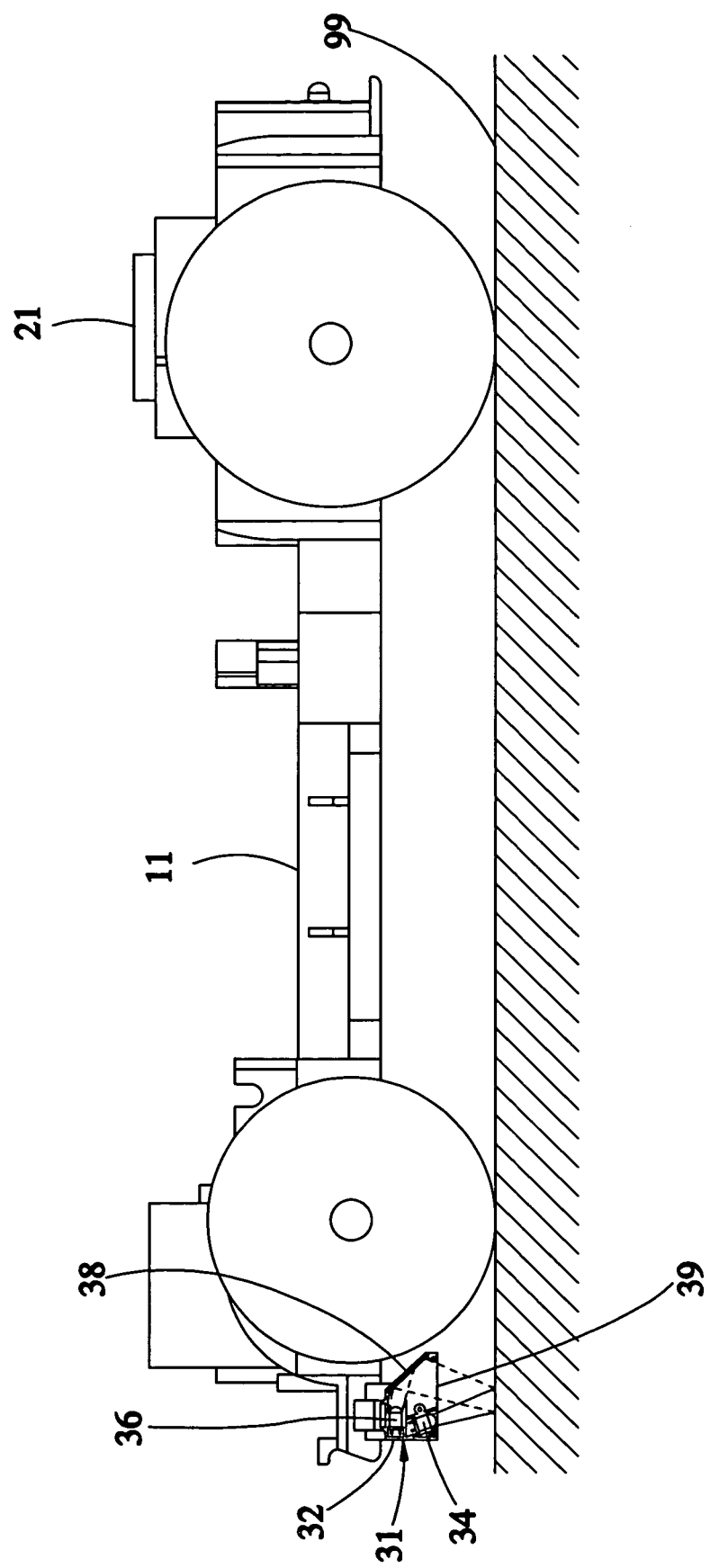
FIG. 2 is a side view of the preferred embodiment of the present invention.
Figure 3:
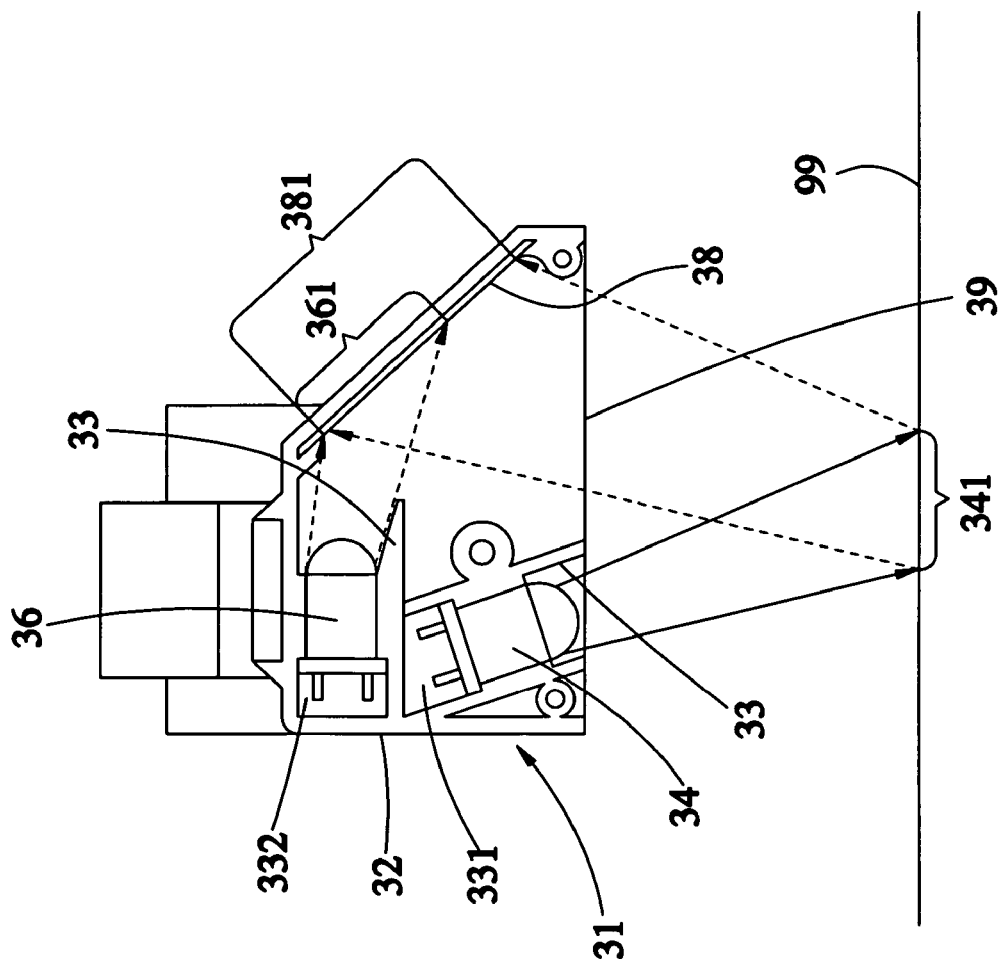
FIG. 3 is a schematic view of a part of the preferred embodiment of the present invention, illustrating the interrelationship among the elements of the detection system.

Referring to FIGS. 1-3, an obstacle-detectable mobile robotic device 10 constructed according to a preferred embodiment of the present invention is composed of a frame body 11, a control circuit 21, and a detection system 31.

The frame body 11 can travel on a surface 99, such as the ground, having parts and components, like a power-based driving mechanism, rollers, and so on, that are known as prior art and not the primary disclosure of the present invention such that no further recitation is necessary.

The control circuit 21 is mounted to the frame body 11 and capable of controlling the way and direction that the frame body 11 travels. Because the control circuit 21 is known as prior art and not the primary disclosure of the present invention such that no further recitation is necessary.

The detection system 31 is electrically connected with the control circuit 21, having a housing 32, an optical emitter 34, an optical receiver 36, and a reflector 38. The housing 32 is mounted to the frame body 11, having an opening 39 facing the surface 99, i.e. the ground. The housing 32 includes two spacers 33 for partitioning an inner space thereof into two compartments 331 and 332. The optical emitter and receiver 34 and 36 are electrically connected with the control circuit 21 and located inside the two compartments 331 and 332 respectively. The optical emitter 34 can be an infrared emitter, emitting the light toward the surface 99 at a predetermined angle and defining a projection area 341 on the surface 99. The reflector 38 is mounted in the housing 32 and can be a mirror surface or a metallic surface, facing the projection area 341 at a predetermined angle. The light of the optical emitter 34 emitted to the projection area 341 is reflected to the reflector 38 to define a reflection area 381 on the reflector 38. The location of the reflection area 381 is variable subject to the height that the surface 99 is positioned. The optical receiver 36 is an infrared receiver, facing the reflector 38 and defining a receiving area 361 on the reflector 38. The receiving area 361 never overlaps the surface 99.

Figure 4:
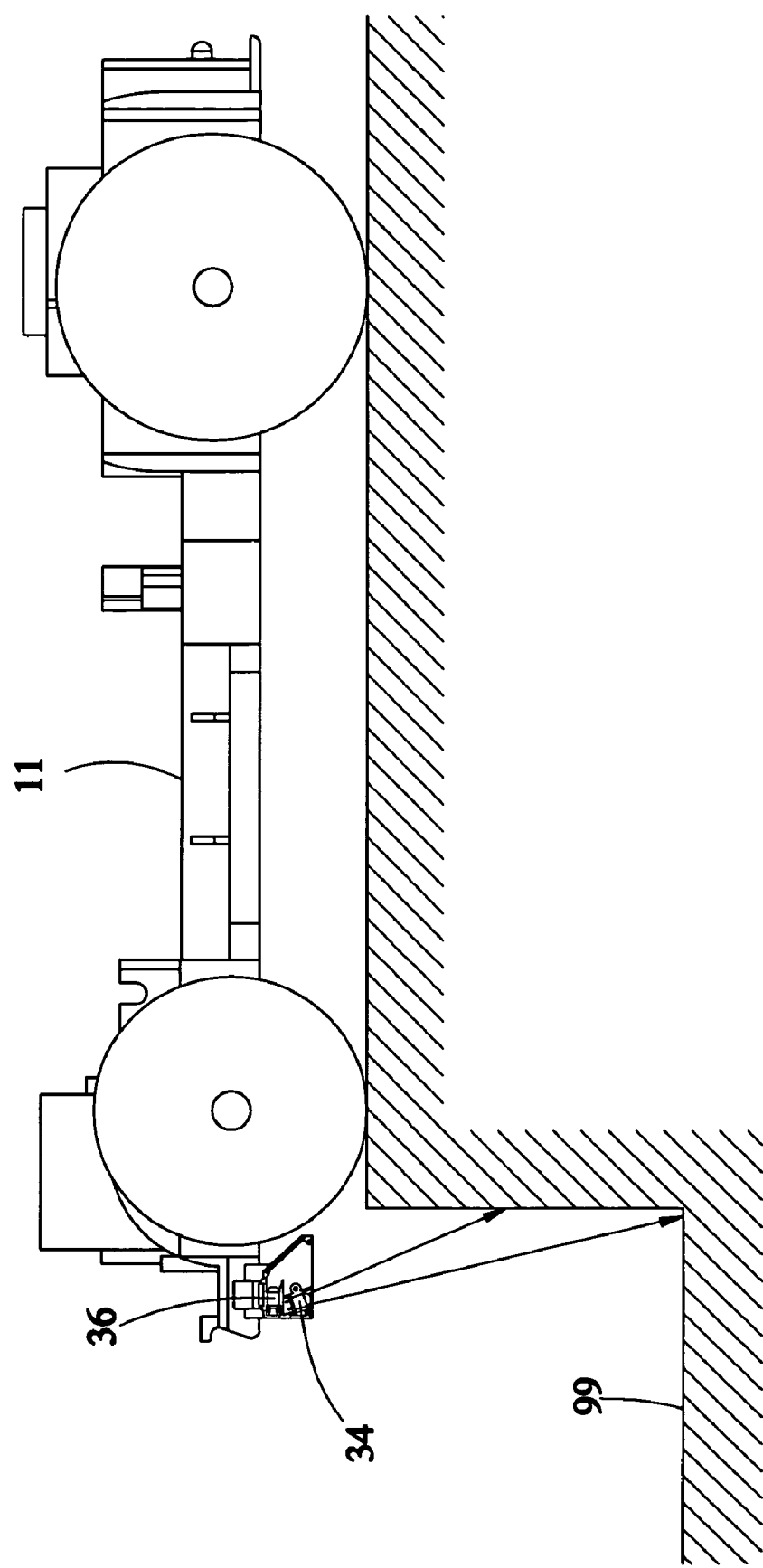
FIG. 4 is a side view of the preferred embodiment of the present invention, illustrating height difference of the ground.

As shown in FIG. 2, while the present invention is operated; for example, while the robotic device 10 travels on the surface 99 defined as the ground, the surface 99 is spaced from the optical emitter 34 for a predetermined distance like 4 cm, the reflection area 381 overlaps the receiving area 361, and meanwhile, the optical receiver 36 receives the light from the optical emitter 34, such that the robotic device 10 identifies it as smooth ground to take none of any elusive action. As shown in FIGS. 3 and 4, while the surface 99 has a height difference, e.g. a stairstep having a height of 15 cm, to be more distant from the optical emitter 34, the light on the projection area 341 fails to be reflected to the reflector 38 and to generate the reflection area 381; namely, the reflection area 381 does not overlap the receiving area 361 such that identifies it as a barrier to take an elusive action. Accordingly, whether the light from the optical emitter 34 is received by the optical receiver 36 depends on whether the receiving area 361 overlaps the reflection area 381 to enable the robotic device 10 to identify itself as proximity or non-proximity to the surface 99 and then such status of proximity is transmitted to the control circuit 21. Based on such status, the control circuit 21 controls the robotic device 10 to take a corresponding action, such as elusive or turning action.

Figure 5:
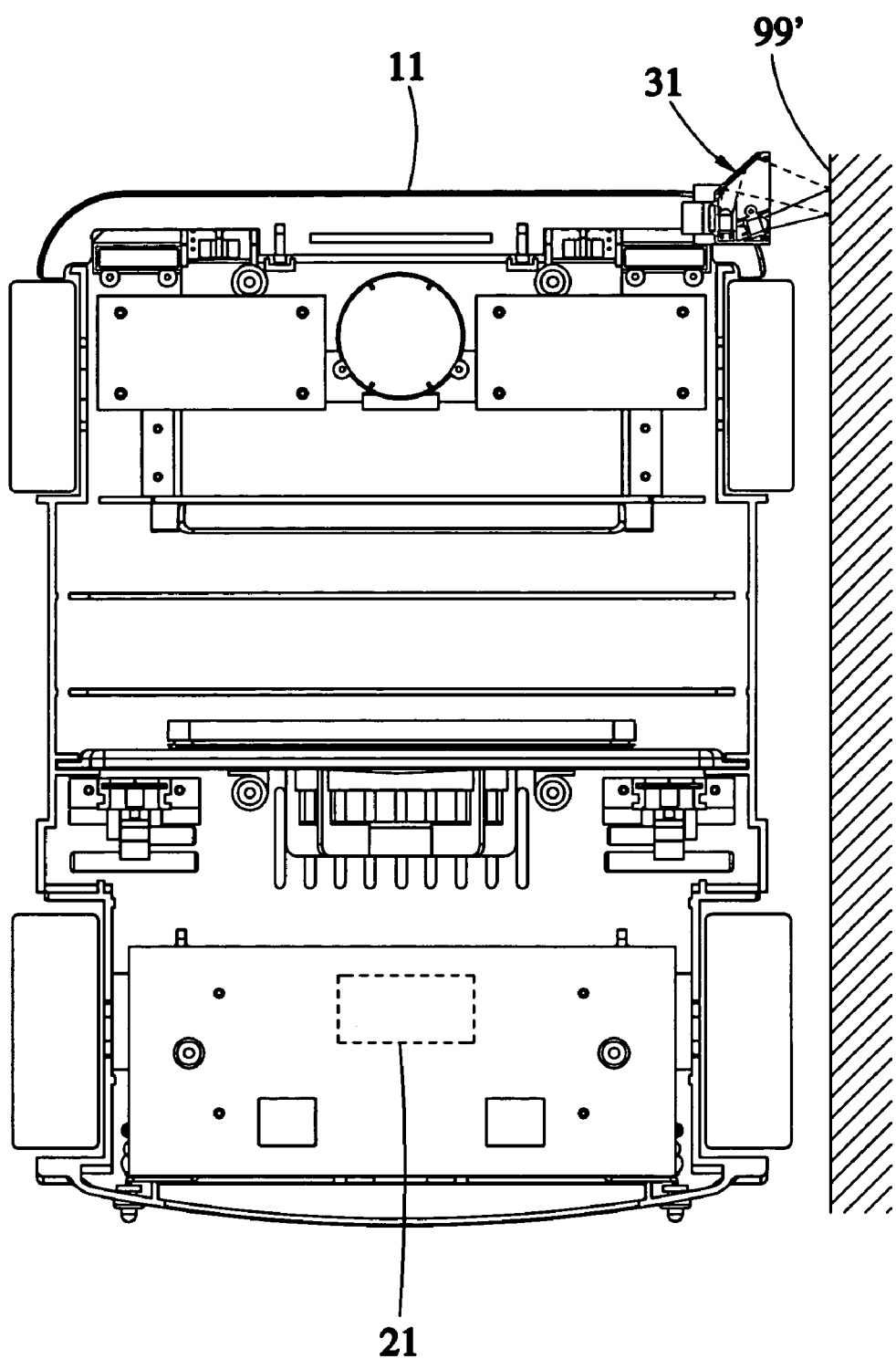
FIG. 5 is a top view of the first preferred embodiment of the present invention, illustrating that the detection system is mounted to a lateral side of the frame body.

Referring to FIG. 5 together with FIG. 3, the detection system 31 is alternatively mounted to a lateral side of the frame body 11 for detecting the proximity of the frame body 11 to a wall surface 99'. The way of the detection is contrary to the aforementioned one of the ground. In other words, while the reflection area 381 overlaps the receiving area 361, it is identified as proximity of the robotic device 10 to the wall surface 99'; while the reflection area 381 does not overlap the receiving area 361, it is identified as non-proximity of the robotic device 10 to the wall surface 99'; thus, the control circuit 21 controls the robotic device 10 based on the status of proximity or non-proximity to take a corresponding action, such as elusive or turning action.

Because the optical receiver 36 is located inside the housing 32, the receiving area 361 does not overlap the surface 99; that is, while projected on the surface 99 (the ground or the wall surface), the external light pollution is not subject to direction reception by the optical receiver 36 but has to be reflected by the reflector 38 to the reflection area 381 to be successfully received by the optical receiver 36. Any light which can be reflected to the reflection area 381 has to be projected onto the surface 99 at a specific angle. Any other light which is projected on the surface 99 at other angle is polarized light and is not easily reflected to the reflection area 381. Therefore, the present invention is not subject to the misjudgment.

In conclusion, the present invention includes the following advantages.

1. More accurate obstacle detection: The present invention is not vulnerable to the interference of the external environment and can do more accurate detection of proximity to the ground or the wall surface, further having better obstacle-elusive potency.

2. Not vulnerable to the ambient light pollution: The present invention employs the optical elements for emission and reception to enable itself to be not vulnerable to the ambient light pollution and to have more sensitive and accurate detection potency.

What is claimed is:

1. An obstacle-detectable mobile device, comprising:
   a frame body capable of traveling on a surface;
   a control circuit mounted to said frame body for controlling traveling manner and direction of said frame body and configured to avoid obstacles obstructing the mobile device; and
   a detection system mounted to said frame body and electrically connected with said control system, said detection system having an optical emitter, an optical receiver, and a reflector, said optical emitter emitting the light toward the surface at a given angle to define a projection area on the surface, said reflector facing said projection area, the light emitted to the projection area being reflected to said reflector to define a reflection area on said reflector, the reflection area being variably located on said reflector subject to a height that the surface is positioned, said optical receiver facing said reflector to define a receiving area on said reflector, the receiving area never overlapping the surface;
   wherein the reflection area is overlapped with said receiving area when said optical emitter is spaced from the surface at a given distance; wherein the reflection area is not overlapped with the receiving area when said optical emitter is farther than the given distance from the surface; wherein said optical receiver being enabled to receive the light from said optical emitter is dependent on whether or not the receiving area is overlapped with the reflection area; and wherein the detection system of the mobile device is configured to reject ambient light pollution and avoid misdetection of obstacles.

2. The obstacle-detectable mobile robotic device as defined in claim 1, wherein said detection system comprises a housing and at least one spacer, said housing being mounted to said frame body and having an opening facing the surface, said spacer partitioning an inner space of said housing into two compartments; said optical emitter and receiver are located in said two compartments respectively; said reflector is located in said housing.

3. The obstacle-detectable mobile robotic device as defined in claim 1, wherein said reflector is a mirror surface or a metallic surface.

4. The obstacle-detectable mobile robotic device as defined in claim 1, wherein said optical emitter comprises an infrared emitter and said optical receiver comprises an infrared receiver.

* * * * *